(12) United States Patent
Shi et al.

(10) Patent No.: US 12,328,148 B2
(45) Date of Patent: *Jun. 10, 2025

(54) COMMUNICATION IN A SWITCHING NETWORK

(71) Applicant: Microsoft Technology Licensing, LLC, Redmond, WA (US)

(72) Inventors: Kai Shi, Cambridge (GB); Paolo Costa, London (GB); Hitesh Ballani, Cambridge (GB); Istvan Haller, Cambridge (GB); Daniel Jonathan Finchley Cletheroe, Cambridge (GB); Sophie Gloria Lange, Cambridge (GB); Raphael Eric Alfred Behrendt, Cambridge (GB); Foteini Karinou, Cambridge (GB); Krzysztof Jozwik, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,672

(22) Filed: Dec. 28, 2023

(65) Prior Publication Data

US 2024/0195511 A1 Jun. 13, 2024

Related U.S. Application Data

(63) Continuation of application No. 17/763,158, filed as application No. PCT/US2020/050929 on Sep. 16, 2020, now Pat. No. 11,901,955.

(30) Foreign Application Priority Data

Sep. 24, 2019 (EP) .................................... 19199314

(51) Int. Cl.
*H04B 10/69* (2013.01)
*H04B 10/508* (2013.01)
*H04B 10/516* (2013.01)

(52) U.S. Cl.
CPC ....... *H04B 10/6971* (2013.01); *H04B 10/508* (2013.01); *H04B 10/516* (2013.01)

(58) Field of Classification Search
None
See application file for complete search history.

(56) References Cited

U.S. PATENT DOCUMENTS 6,909,742 B1 * 6/2005 Leonosky .......... H04B 10/2543 375/232
9,621,299 B2 * 4/2017 Ishihara ............. H04B 10/6161
(Continued)

OTHER PUBLICATIONS

Medhi, Von Neumann Architecture, 2012 (Year: 2012).*

*Primary Examiner* — Jai M Lee
(74) *Attorney, Agent, or Firm* — Barta Jones, PLLC (57) ABSTRACT

A switching network for effecting point-to-point communication between nodes has a time-varying switching configuration, which causes successive activation and deactivation of multiple channels of the switching network, a first of the channels connecting, when activated, a transmitter node and a first receiver node, and a second of the channels connecting, when activated, the transmitter node and a second receiver node. In a training phase, a method comprises: transmitting from the transmitter node via each channel a known training signal, to cause each receiver node to receive a distorted training signal, using the first distorted training signal and knowledge of the first known training signal to determine respective one or more transmit-side equalizer (EQ) coefficients for each channel, and storing, in memory accessible to the transmitter node, the first transmit-side EQ coefficients, in association with each channel, for use in (Continued)

conducting scheduled communications over the switching network in a communications phase.

20 Claims, 8 Drawing Sheets

(56) References Cited

U.S. PATENT DOCUMENTS

| | | | |
|---|---|---|---|
| 10,141,944 B2* | 11/2018 | Rachid | H03M 1/12 |
| 10,148,339 B2* | 12/2018 | Jovanovic | H04B 1/10 |
| 10,320,489 B2* | 6/2019 | Xiao | H04B 10/548 |
| 10,567,211 B2* | 2/2020 | Yu | H04B 10/6164 |
| 2006/0088090 A1* | 4/2006 | Azenkot | H04L 25/03057 |
| | | | 375/233 |
| 2017/0170993 A1* | 6/2017 | Jia | H04L 25/03006 |
| 2019/0199365 A1* | 6/2019 | Rachid | H03M 1/1038 |

* cited by examiner

COMMUNICATION IN A SWITCHING NETWORK

CROSS-REFERENCE TO RELATED APPLICATION

This application is a continuation application of and claims priority to U.S. patent application Ser. No. 17/763,158, entitled "COMMUNICATION IN A SWITCHING NETWORK," filed on Mar. 23, 2022, which is a U.S. national phase application of PCT Application. No. PCT/US2020/050929, entitled "COMMUNICATION IN A SWITCHING NETWORK," filed on Sep. 16, 2020, which claims priority to EP Application No. 19199314.6, filed on Sep. 24, 2019, the disclosures of which are incorporated herein by reference in their entireties.

TECHNICAL FIELD

The present disclosure pertains generally to communication in a switching network.

BACKGROUND

Switching network have been used in various contexts. For example, circuit-switched networks supported some of the earliest forms of telephone communication.

More recently, so-called active optical networks have been provided as a means of achieving high-throughput optical communication. For example, an active optical network comprising one or more optical switches may be used to achieve high-throughput communication within a modern data centre. An optical switch is analogues in some respects to a traditional electrical switch, but facilitates switching between different optical communication paths (channels). An "all optical" switch maintains signals in optical form throughout. Another form of optical switch operates to convert incoming signals to electrical signals for the purpose of switching, which are then converted back to optical signals.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

This disclosure applies generally to a system in which at least three nodes are connected by a switching network, and equalization is applied to account for the introducing of linear and/or nonlinear channel response. Such effects may be referred to herein using the synonymous terms "distortion" and "impairments". For example, one such effect is inter-symbol interference (ISR) which can be mitigated, at least to some extent, using equalization. Each pair of nodes can communicate by a different channel, which may have different conditions from any other channel. A core issue addressed herein is that of achieving faster convergence of equalizer coefficients in such systems.

This disclosure specifically addresses point-to-point network architectures (which would, for example, encompass active but not passive optical networks), and recognizes that, in a point-to-point architecture, equalization can be applied at the transmit side using different equalization coefficients for each channel which are specifically optimized for that channel. This would not be possible in a point-to-multipoint architecture (such as a passive optical network), because in that event, transmitted signals will end up, as they pass through the network, being multicast over multiple channels to multiple receiving nodes, meaning that the transmitter is unable to optimize its equalization for any one of those channels (i.e. it can only apply one set of "blanket" EQ settings before transmitting a signal to be multicast). However, in a point-to-point architecture, each transmission will be conveyed by only a single channel, and this disclosure recognize that it is therefore possible to optimize the equalizer coefficients for each channel at the transmit side—instead, or in conjunction with, channel-optimized receive-side equalization.

A first aspect of the present disclosure provides a method of communicating signals via a switching network for effecting point-to-point communication between nodes, the switching network having a time-varying switching configuration, which causes successive activation and deactivation of multiple channels of the switching network, a first of the channels connecting, when activated, a transmitter node and a first receiver node, and a second of the channels connecting, when activated, the transmitter node and a second receiver node, the method comprising: in a training phase: transmitting from the transmitter node via the first channel a first known training signal, to cause the first receiver node to receive a first distorted training signal, using the first distorted training signal and knowledge of the first known training signal to determine one or more first transmit-side equalizer (EQ) coefficients, and storing, in memory accessible to the transmitter node, the first transmit-side EQ coefficients, in association with the first channel, transmitting from the transmitter node to the second receiver node a second known training signal, to cause the second receiver node to receive a second distorted training signal, using the second distorted training signal and knowledge of the second known training signal to determine one or more second transmit-side EQ coefficients, and storing, in memory accessible to the transmitter node, the second transmit-side EQ coefficients, in association with the second channel: wherein, in a communication phase, the transmitter node uses an available schedule to determine, for each time interval of multiple time intervals, which of the first and second channels is activated, and uses the transmit-side EQ coefficients associated with that channel to pre-equalize signals prior to transmission in that time interval via that channel. At least one of the receiver nodes applies adaptive equalization to signals received from the transmitter node in the communication phase to account for time-varying channel conditions of the channel between that receiver node and the transmitter node

BRIEF DESCRIPTION OF THE DRAWINGS

To assist understanding of the present disclosure and to show how embodiments may be put into effect, reference is made by way of example to the accompanying drawings in which.

DETAILED DESCRIPTION

The described embodiments provide what is referred to herein as "equalizer caching." a technique for fast equalizer convergence in frequency-synchronous, circuit-switched networks, i.e., networks where all nodes are connected by a circuit switch and are synchronous to a common clock frequency and phase.

In the described embodiments of equalizer caching, a receiver "remembers" the end-to-end inverse of channel characteristics between any given source (transmitter) and itself, and can rapidly adjust receive-side equalizer coefficients to compensate for degradation of a signal in the channel. Thus, every time the underlying circuit switch is reconfigured to connect a new pair of nodes, they can rely on the previously-determined value of the equalizer coefficients to determine the ideal inverse of the channel and, hence, are able to very quickly equalize the incoming data. In contrast, past techniques for fast equalizer convergence relying on large step size or quasi-deterministic steepest decent cannot accommodate the requirement of circuit switches with fast reconfigurability at low cost.

However, the focus of this disclosure is cases where equalization is applied either partially or solely at the transmitter side, such as channel pre-coding, pre-emphasis or vectoring (e.g. G.fast). In such cases, equalizer caching at the transmit-side can be used to achieve fast convergence of the adaptive filters. This is critical when the transmitter requires pre-emphasis, pre-coding or vectoring which is dependent on which receiver the data is sent to. A loop back link is used to send the update information back to the transmitter side during the bootup stage. This can be done when the specific pair of nodes are operating in a reverted manner (data sending from the Rx to Tx in FIG. 1). After that, this link is not mandatory, and the digital filters at the transmitter side can use the coefficients that are cached in the memory.

A key challenge for any time-slotted network relying on fast circuit switches, for example an optically-switched network, is that each node needs to receive traffic from different senders across the timeslots.

Equalizer caching is particularly beneficial for high-speed modulation such as 4-level pulse amplitude modulation (4PAM) or coherent quadrature amplitude modulation (QAM), due to the channel impairments, such as low-pass characteristics and optical polarization rotation and mode dispersion.

Figure 5A:
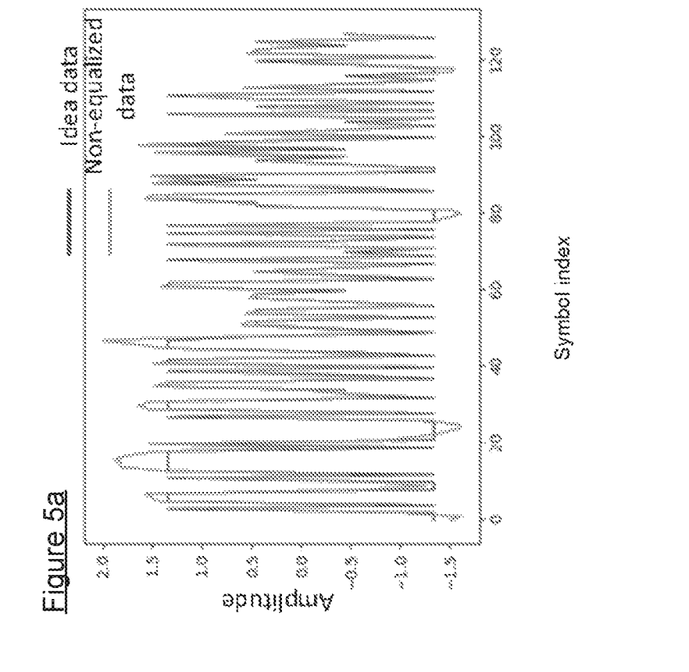
FIGS. 5a and 5b show, respectively, results of without any adaptive equalization and results of equalizer caching as described herein.
Figure 5B:
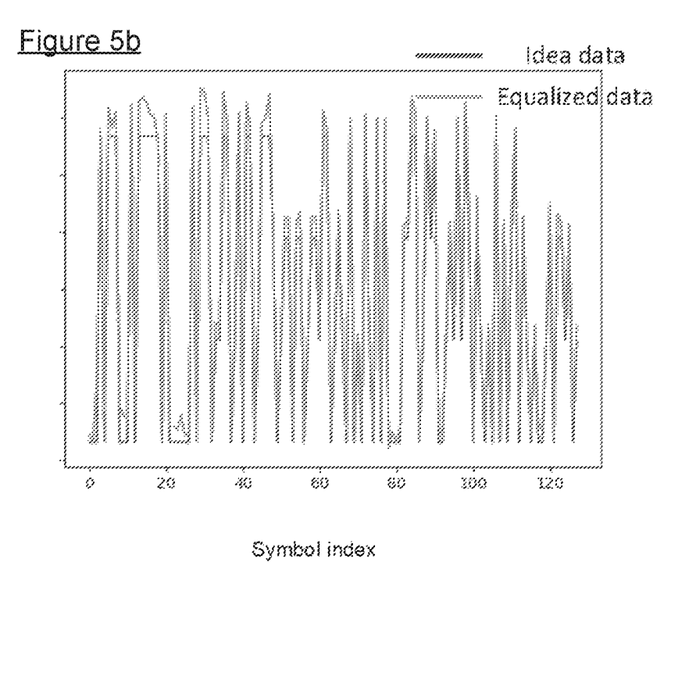
Figure 5C:
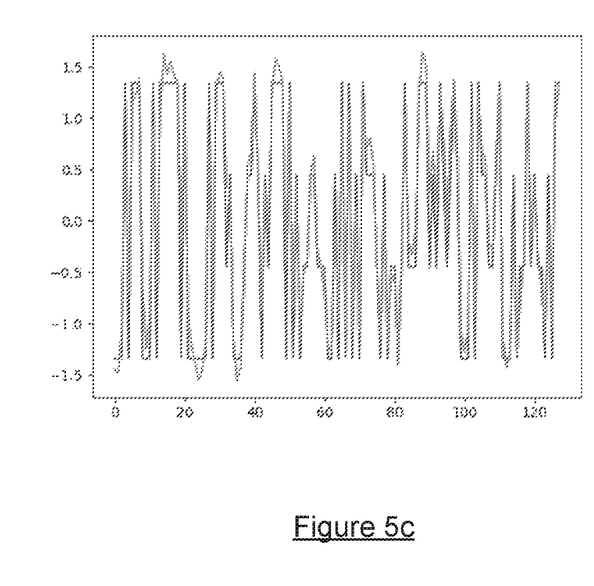
FIGS. 5c and 5d shows, respectively, results obtained using a conventional filter and results obtained using "equalizer caching
Figure 5D:
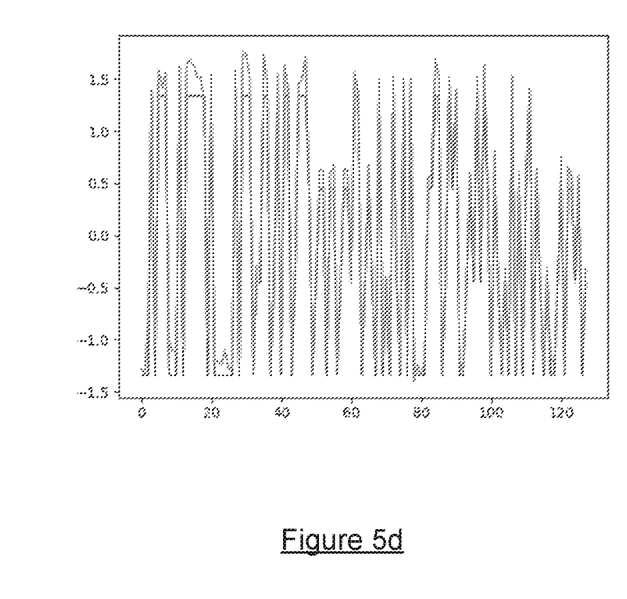

By way of comparison. FIG. 5a shows a non-equalized received signal in comparison with an ideal signal transmitted using 4PAM modulation. The optimised clock phase has been applied to the signal, but equalization has not been applied to compensate for channel distortion. By contrast, FIG. 5b shows successful compensation of channel distortion using the described equalizing caching techniques. By way of further comparison, FIGS. 5c and 5d shows results with a conventional filter, and results obtained using the described caching method respectively.

An alternative to the described equalizer caching would be the use of adaptive channel equalization to reverse the channel distortion of the signal. However, the adaptation process typically takes at least a couple of thousand symbols. This is a key impediment for the practicality of a fast circuit-switched network: for example, a network with sub-50 ns timeslots (i.e., sub 5 ns reconfiguration). Such fast switching is critical to support latency-sensitive workloads atop the network.

Figure 6:
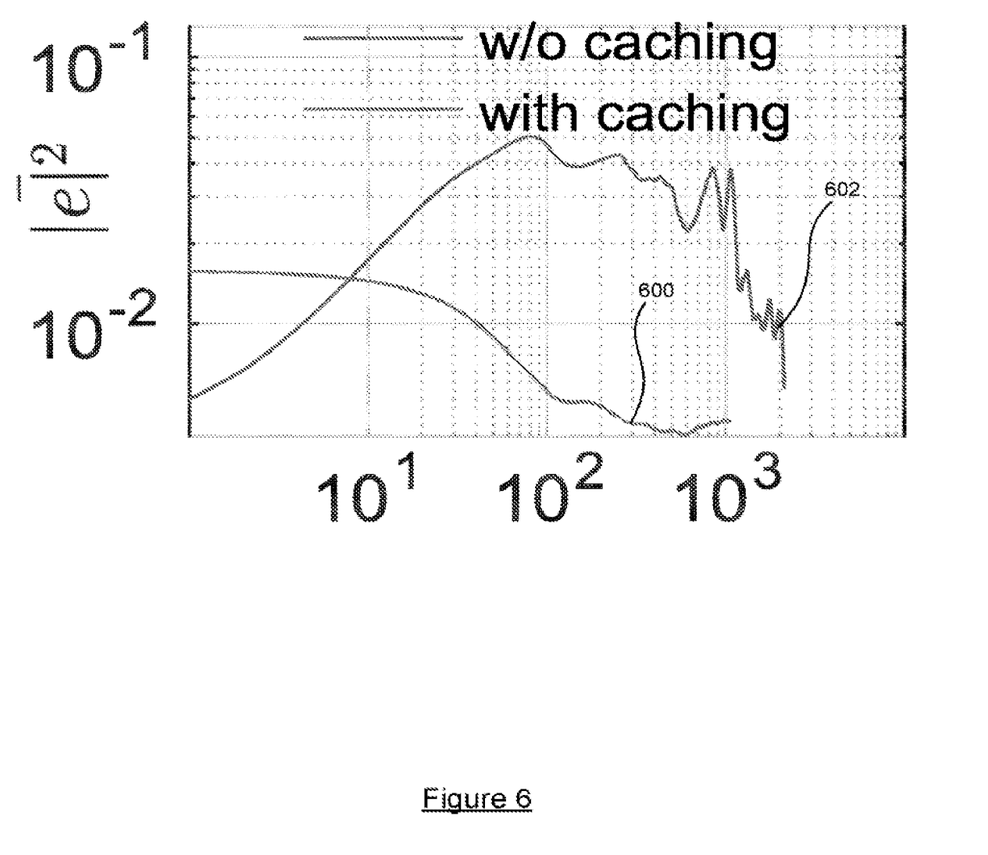
" and FIG. 6 shows a graph of equalizer convergence for conventional adaptive equalization and equalizer caching as described herein.

Currently, equalizer used for multilevel signal equalization relies on the equalizer to learn the channel characteristics adaptively. The convergence rate of an equalizer is normally characterized by a learning curve of the kind illustrated in FIG. 6. The equalizer converges when the mean square error (MSE) reaches to a steady state value. The speed of the convergence of conventional least-mean-square (LMS) equalizer, which uses stochastic steepest decent algorithms to update its coefficients, is decided by the step size and trades off with the MSE after convergence. Therefore, to reduce the convergence time, a larger step size is required, and this results in a worse signal to noise ratio (SNR) at the output of the equalizer.

Another approach is to employ a quasi-deterministic approach of tap coefficient update, such as a recursive least square (RLS) equalizer. However, the implementation complexity of the equalizer increases dramatically comparing to the LMS equalizer, which is far beyond the cost and power constrains of the transceivers used in today's circuit-switched networks. The convergence rate is limited to 1000 symbols for the LMS equalizer. For applications that require short packet size which contains only a few thousand symbols, the decrease of network efficiency is dominant by the equalizer convergence rate.

The described equalizer caching is able to match the performance of conventional adaptive equalization whilst at the same time achieving materially faster equalizer convergence (convergence being the point at which EQ coefficient (s) required to adequately compensate for channel impairments have been determined).

Figure 1:
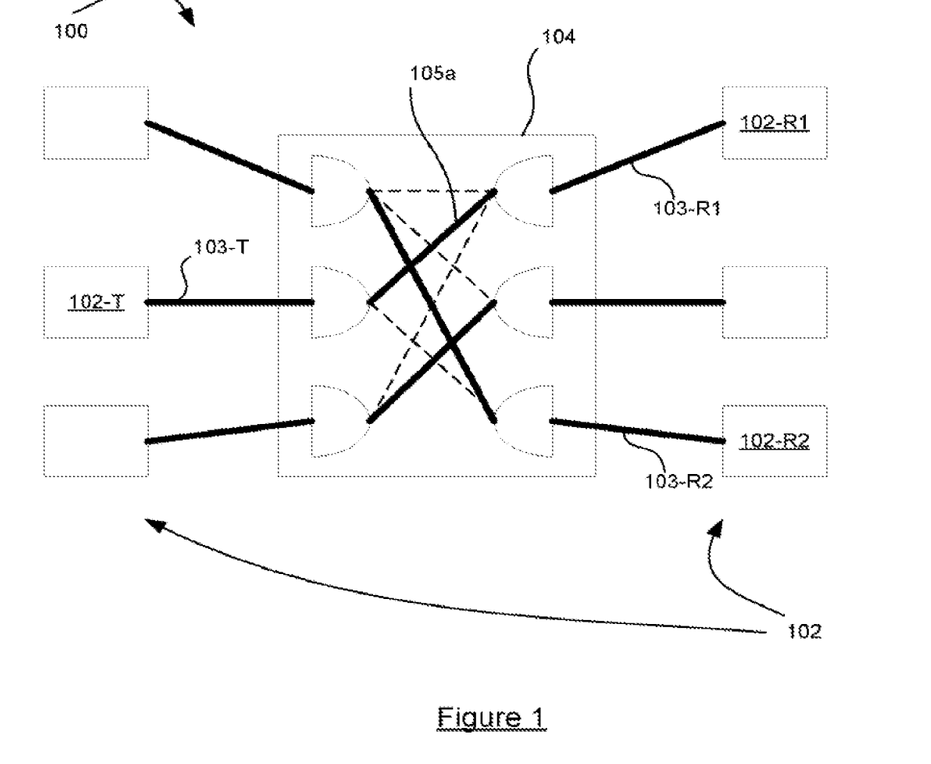
FIG. 1 shows a schematic block diagram of a system in which a plurality of nodes are connected by a switching network.

FIG. 1 shows a highly schematic block diagram of a system 100 comprising a plurality of communicating nodes 102 and a switching network 104 to which the nodes 102 are connected. In the present example, the switching network takes the form of an active optical network comprising at least one optical switch. Each of the nodes 102 is connected to the switching network 104 via a physical connection. The nodes 102 are synchronized to a common clock signal, and thus to a common clock frequency and clock phase.

By way of example, a transmitter node 102-T of the plurality of nodes 102 is shown connected to the switching network 104 by a physical connection 103-T. First and second receiver nodes of the plurality of nodes 102, denoted by reference numerals 102-R1 and 102-R2 respectively, are shown connected to the switching network 104 via physical connections denoted by reference numerals 103-R1 and 103-R2 respectively. Other nodes are shown connected to the switching 104 in the same way but are not individually marked with reference numerals. In the present example, each physical connection takes the form of an optical connection such as optical fibre or a bundle of optical fibres.

The switching network 104 can support multiple "channels" between different pairs of the nodes 102. However, only a subset of those channels can be activated at any one time. The switching network 104 has a switching configuration, which can be varied to change which subset of the channels is activated at any one time. According to the terminology used herein, a channel between two nodes is said to be "activated" when the switching network 104 is configured to provide a connecting path connecting the physical connection of one of those nodes to the physical connection of the other. For as long as the channel remains activated, it connects that node and that other node together, such that they are able to communicate (in a unidirectional or bidirectional manner—see below).

By way of example. FIG. 1 shows a switching configuration of the switching network 104 in which a connecting path 105a currently provided between the physical connection 103-T connecting the transmitter node 102-T to the switching network 104 and the physical connection 103-R1 connecting the first receiver node 102-R1 to the switching network 104. Hence, in that configuration, a channel connecting the transmitter node 102-T to the first receiver node 102-R1 is said to be currently activated. Conversely, in the depicted configuration, no connecting path is currently provided from the transmitter node 102-T to the second receiver node 102-R2. Hence, although the switching network 104 is capable of supporting a channel between those nodes 102-T, 102-R2, it is not doing so at this particular time and that channel is therefore said to be currently deactivated. Were the switching configuration to be changed to remove the connecting path 105a between the transmitter node 102-T and the first receiver node 102-R1, and replaced with a connection path between the transmitter node 102-T and the second receiver node 102-R2, then the former channel would at that point said to be deactivated and the latter channel would be said to be activated.

The combination of the physical connections of those two nodes together with connecting path between them is an example of a "physical channel" as that term is used herein. The term "logical channel" may be used to refer to such a physical channel in combination with a carrier frequency used to communicate signals via the physical channel. Both the physical and logical channel are said to be activated when the relevant connection path is provided.

Figure 2:
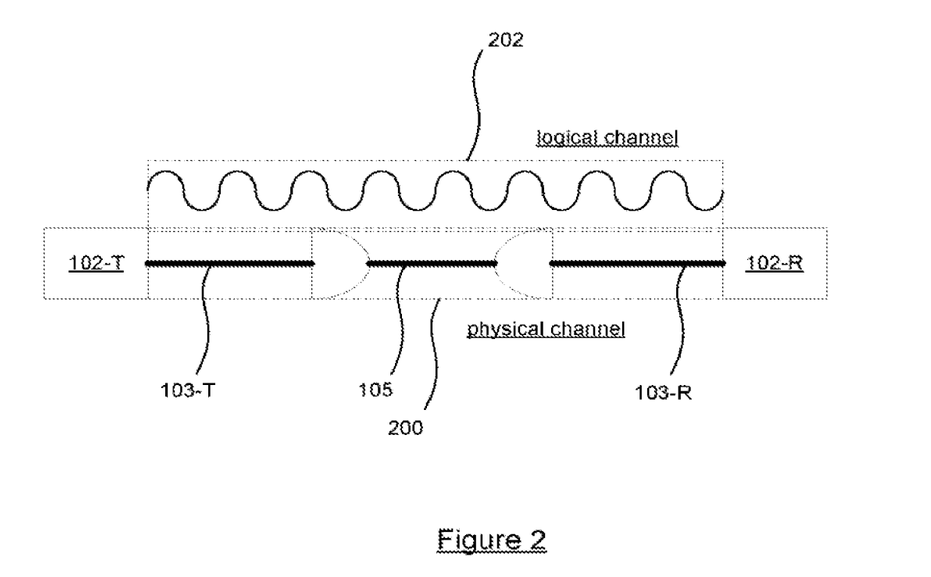
FIG. 2 shows an example of a physical channel and a logical channel supported by the physical channel.

FIG. 2 shows a schematic illustration of a physical channel 200 which includes the combination of a physical connection 103-T connecting a transmitter node 102-T to the switching network 104, a physical connection 103-R connecting a receiver node 102-R to the switching network 104, and a connecting path 105 connecting those physical connections 103-T. 103-R to each other. Although not shown explicitly in FIG. 2, the physical channel 200 will also include a number of signal processing components in practice (see below). A logical connection 202 supported by the physical connection 200 is shown and, although only a single logical connection 202 is shown, a single physical channel 200 may support multiple logical channels 202 each of which, may for example, correspond to a different carrier frequency. For example, the physical channel 200 could support two logical channels to allow simultaneous bidirectional communication between the nodes 102-T and 102-R. Alternatively or additionally, multiple logical channels may be provided for which both facilitate communication in the same direction from the transmitter node 102-T to the receiver node 102-R.

It is noted that the terms "transmitter" and "receiver" nodes are convenient labels for describing one direction of communication between the nodes. The terminology does not imply that any node is necessarily limited to only transmitting or receiving. A node described in one context as a transmitter node may or may not also receives signals in the same way from other nodes connected to the switching network 104. That is to say, for any given pair of nodes, both unidirectional and bidirectional communication are possible. FIG. 1 shows transmitter nodes on the left-hand side separately from receiver nodes on the right-hand side. Note, however, that transmitter and receiver nodes could in fact be the same nodes (and, of course, in that case there would generally be no need for the switching network 104 to support a channel from one node back to itself). This applies throughout this description whenever the terms transmitter node and receiver node are used.

Figure 3A:
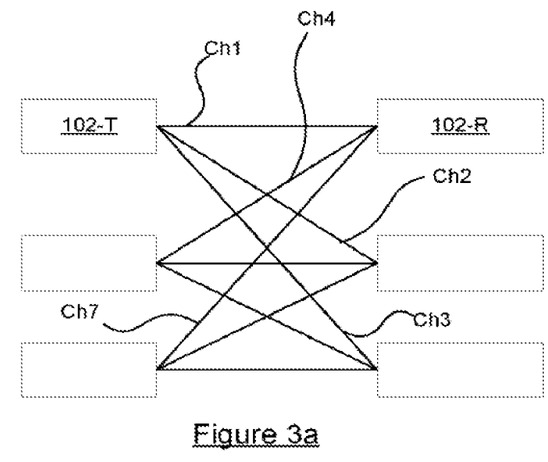
FIG. 3a shows a set of channels which may be supported by a switching network, a subset of which may be activated at any one time.

FIG. 3a shows an example of a set of channels that may be supported by the switching network 104. Purely by way of example, three transmitter nodes and three receiver nodes are shown, and the switching network 104 can support a connection from any one of the three transmitter nodes to any one of the three receiver nodes. There are therefore nine channels (first to ninth channels) in total in this example. However, a maximum of three channels can be activated at any one time. By way of example, a first channel CH1 is shown between a transmitter node 102-T and a receiver node 102-R. That transmitter node 102-T can also connect to the remaining two receiver nodes via second and third channels CH2. CH3 respectively. Only one of the first, second and third channels CH1. CH2 and CH3 can be activated at any one time hence, at any one time, the transmitter node 102-T can only be communicating with one of the receiver nodes. Fourth and seventh channels CH4, CH7 can connect the receiver node 102-R to the other two transmitter nodes, and again only one of these can be activated at any one time.

Figure 3B:
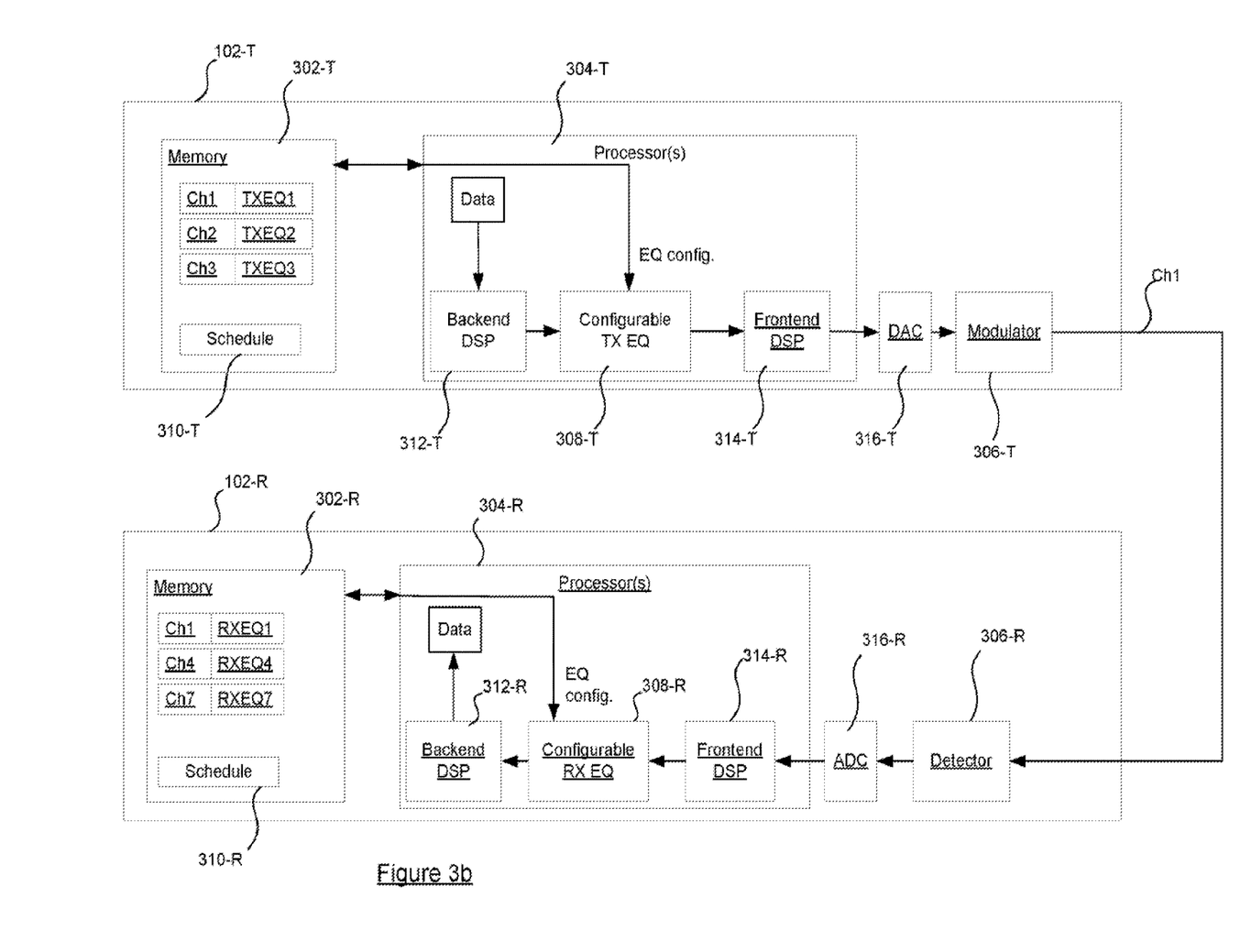
FIG. 3b shows a schematic block diagram of a transmitter node in communication with a receiver node.

FIG. 3b shows a highly schematic block diagram of the transmitter node 102-T and the receiver node 102-R of FIG. 3a, which will now be described. Note this description applies equally to any transmitter node and any receiver node mentioned herein.

Transmitter Node

The transmitter node 102-T is shown to comprise a memory 302-T coupled to one or more processors 304-T (e.g. FPGAs and/or ASICs) of the transmitter node 102-T. Typically, communication processors that are used in networks take the form ASICs, however the use of programmable processor(s) such as FPGAs is nonetheless viable. The one or more processors 304-T may be referred to as the processor 304-T for conciseness, noting that the description applies equally to multiple processors.

The processor 304-T is shown to implement functional components which include a transmit-side backend digital signal processor 312-T (TX backend DSP), a transmit-side equalizer (TX EQ) 308-T. and a transmit-side frontend DSP 314-T (TX frontend DSP). The TX backend DSP 312-T receives digital data to be transmitted and processes the data in order to supply the data as a digital signal to the TX EQ 308-T. In the present example, the TX-EQ 308-T operates in the digital domain to apply equalization to the digital signal. The equalized digital signal is, in turn, provided to the TX front-end DSP 314-T for further processing. The TX frontend and backend DSPs 312-T. 314-T represent all of the digital signal processing that is applied before and after the transmit-side equalization. A digital to analogue converter (DAC) 316-T receives a final digital signal from the frontend DSP 316-T. and converts it to analogue form. The analogue signal is, in turn, provided to a modulator 306-T. The DSP processing by the TX backend DSP 312-T includes baseband modulation of the digital data, prior to equalization by the TX EQ 308-T. This is performed in the digital domain. In the analogue domain, the modulator 306-T modulates the signal post-equalization a second time to a carrier frequency before the signals are transmitted via a channel. For an optical circuit switch, the carrier frequency corresponds to the wavelength of the light.

The TX EQ 308-T is a configurable EQ, i.e. having one or more configurable EQ coefficients. The processor 304-T can configure those coefficients as denoted by the arrow from the processor 302-T to the TX EQ 308-T. As shown the memory 302-T holds a different set of TX coefficients (TX coefficients) for each of the first, second and third channels CH2, CH2 and CH3. That is, for every channel that can be activated to connect the transmitter node 102-T to one of the receiver nodes. Each set of EQ coefficients is stored in association with the channel to which it pertains: so, a set of TX coefficients TXEQ1 is shown stored in associated with the first channel CH1, a second set of TX coefficients TXEQ2 is shown stored in association with the second channel CH2 and a third set of TX coefficients TXEQ3 shown stored in association with the third channel CH3.

Note that the term "set of coefficients" can mean a single coefficient or multiple coefficients.

The memory 302-T is also shown to hold a "schedule" 308-T which identifies specific time intervals and additionally indicates which one of the first, second and third channels CH1, CH2, CH3 will be activated in each of those time intervals. The processor 304-T can therefore configure the TX EQ 308-T with the set of TX coefficients associated with whichever channel is currently active. The example of FIG. 3b shows the first channel CH1 to be currently activated and therefore the TX EQ 308-T would be configured with the set of TX coefficients TXEQ1 associated with the first channel CH1.

The subset of time intervals for which a particular channel is activated may be referred to as "cycles" (given a current cycle, the next cycle is the next time interval in which that same channel is activated).

Receiver Node:

The receiver node 102-R is shown to comprise a memory 302-R and one or more processors (e.g. FPGAs and/or ASICs) 304-R communicatively coupled to the memory 302-R. The one or more processors 304-R may be referred to as the processor 304-R for conciseness noting that the description applies equally to multiple processors. The processor 304-R receives digital data from a detector 306-R of the receiver node 102-R, which operates to detect signals on the channel and supply them to an analogue-to-digital converter (ADC) 316-R for conversion to digital form. The digital signals are, in turn, provided to the processor 304-R of the receiver node 102-R.

The processor 304-R implements functional components which include a receive-side frontend DSP 314-R (RX frontend DSP), a configurable receive-side EQ 308-R (RX EQ), and a receive-side backend DSP 312-R (RX backend DSP). These components all operate in the digital domain.

The RX EQ 308-R receives signals via a currently-activated channel and applies equalisation to those signals in order to derive the equalised signals to be provided to the demodulator 306-R. Before that equalization stage, in addition to being converted to digital form, frontend digital signal processing may be applied by the RX frontend DSP 314-T. The receive-side EQ 308-R is also a configurable EQ which the processor 304-R is able to configure with one or more receive-side EQ coefficients (RX coefficients).

Following receive-side equalization, the equalized signals are provided to the RX backend DSP 312-R for further processing, which may for example include digital baseband demodulation.

Similar to the transmitter node 102-T, the receiver node 102-R stores in its memory 302-R a set of RX coefficients for each of the first, fourth and seventh channels CH1, CH4 and CH7. That is, for each channel on which the receiver node 102-R is able to receive signals. The RX coefficients associated with each of the first, fourth and seventh channels CH1, CH4 and CH7 are denoted by reference signs RXEQ1, RXEQ4 and RXEQ7.

The memory 302-R also holds a schedule 310-R for the first, fourth and seventh channels CH1, CH4. CH7, which identifies specific time intervals and additionally indicates which of the first, fourth and seventh channels CH1, CH4 and CH7 is active in each of those time intervals. The processor 304-R can therefore configure the RX EQ 308-R with the set of RX coefficients for whichever channel is currently active. In the present example, that is shown to be the first channel CH1 between the transmitter node 102-T and the receiver node 102-R, therefore the processor 304-R would configure the RX EQ 308-R with the RX coefficients RXEQ1 associated with channel 1 in the memory.

For any given channel, there will therefore be a set of TX coefficients and a set of RX coefficients stored, respectively, at whichever transmitter node and whichever receiver node are connected by that channel. In the example of FIG. 3b, it can be seen that, for the first channel CH1 connecting the transmitter node 102-T and the receiver node 102-R, the set of TX coefficients TXEQ1 are stored at the transmitter node 102-T and the set of RX coefficients for that channel CH1 are stored in the memory 302-R of the receiver 102-R. The TX and RX coefficients for a given channel co-operate to reduce, and preferably substantially eliminate, impairments on that channel. That is to say, it is the combination of the TX EQ applied according to the TX coefficients with the RX EQ applied in accordance with the RX coefficients that has the effect of reducing or eliminating impairments on that channel.

It is expected that optimal distortion reduction will be achievable using a combination of TX and RX EQ at the transmitter node and the receiver node respectively. However, the possibility of only applying equalisation at the TX is not excluded.

Equalisation applied to modulated signals by a TX EQ prior to transmission may be referred to as "pre-equalisation" herein, in order to distinguish of RX EQ applied to received signals.

As indicated above, each channel includes not only the physical connections/links. The channel Ch1 between the transmitter node 102-T and the receiver node 102-R includes everything between the TX frontend DSP 314-T and the RX frontend DSP 314-R—including the DAC 316-T, the modulator 306-T, the detector 306-R and the ADC 316-R. It will be appreciated that, whilst only those components are shown, there may be more components not depicted, such as, electrical amplifiers and/or other analogue components (electrical and/or optical). This applies to all of the channels described herein, with respect to the applicable transmitter and receiver nodes.

The above examples consider digital equalization. As an alternative, equalization could be applied in the analogue domain. Hence, although in the present examples the TX EQ 308-T is a digital equalizer, the relevant description applies equally to an analogue equalizer. Likewise, although the present examples consider digital RX equalization, applying the RX equalization in the analogue domain is also possible, and the relevant description applies equally to an analogue RX EQ. FIG. 3b shows a single configurable TX EQ 308-T and single configurable RX EQ 308-R. The configuration of each EQ 308-T. 308-R would therefore be changed repeatedly in accordance with the applicable schedule as one channel is deactivated and another is activated. As an alternative, multiple EQs could be provided. e.g. one for each channel and in that case each EQ would remain configured for a specific channel and only be used when that channel is activated.

The TX EQ and RX coefficients are initially determined in a "training phase" (or "bootup phase"), for use in a subsequent communication phase. During the subsequent communication phase, they are preferably adapted, using a form of adaptive equalization, to account to residual channel variations. Variations in the channel which affects its distortion profile can for example occur due to thermal fluctuations. Typically, those will be relatively slow variations. e.g. on thermal time scales, which can be accommodated by adaptive equalization (such as decision directed equalization).

Figure 4A:
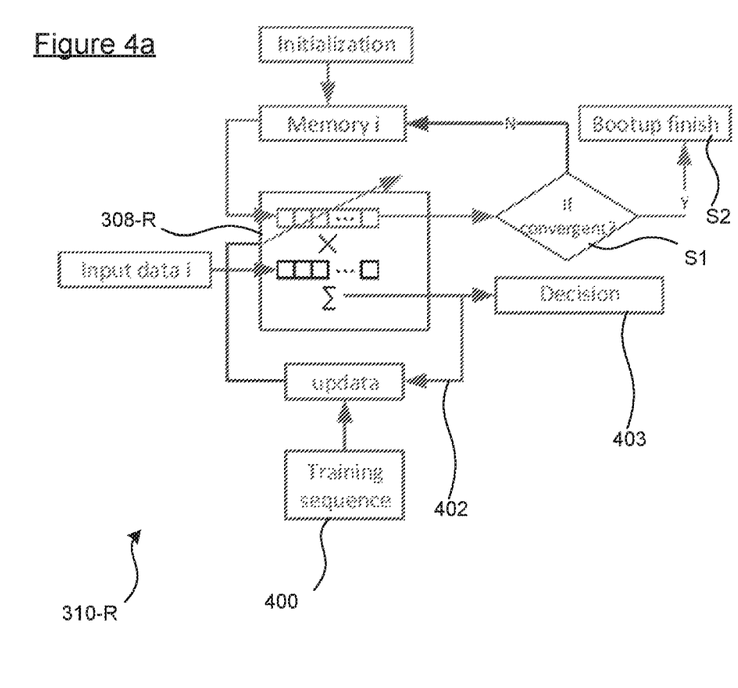
FIGS. 4a and 4b show process flows for determining and applying receive-side equalizer coefficients respectively.
Figure 4B:
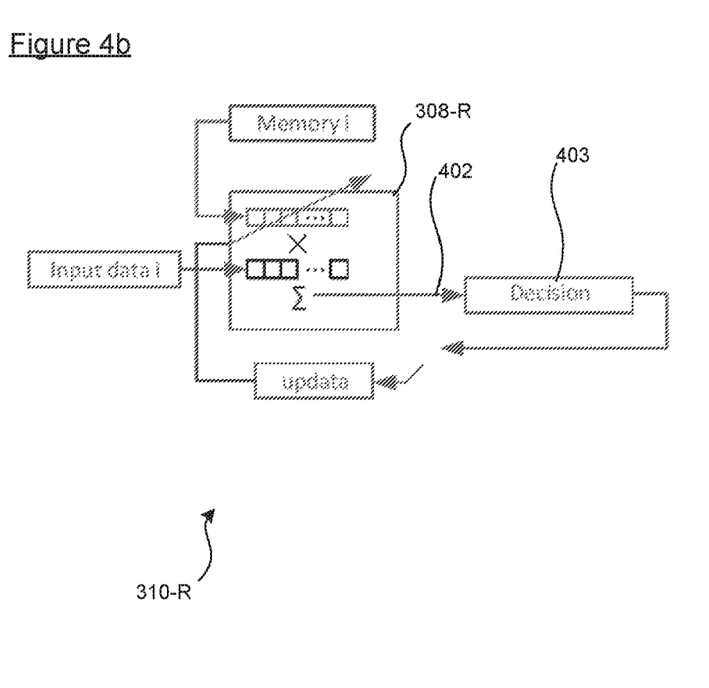

FIG. 4a shows a schematic process flow a training phase in which RX coefficients are determined, and FIG. 4b shows a schematic process flow for the steps of the receiver node 102-R (receiver) after the boot up phase. It is through the process of FIG. 4a that the sets of RX coefficients RXEQ1, RXEQ4, RXEQ7 stored at the receiver 102-R are determined (see FIG. 3b). In the process of FIG. 4b, those RX coefficients are adapted by the receiver 102-R using decision directed equalization (or without update and with constant coefficients obtained from the boot up phase).

Figures 4C, 4D:
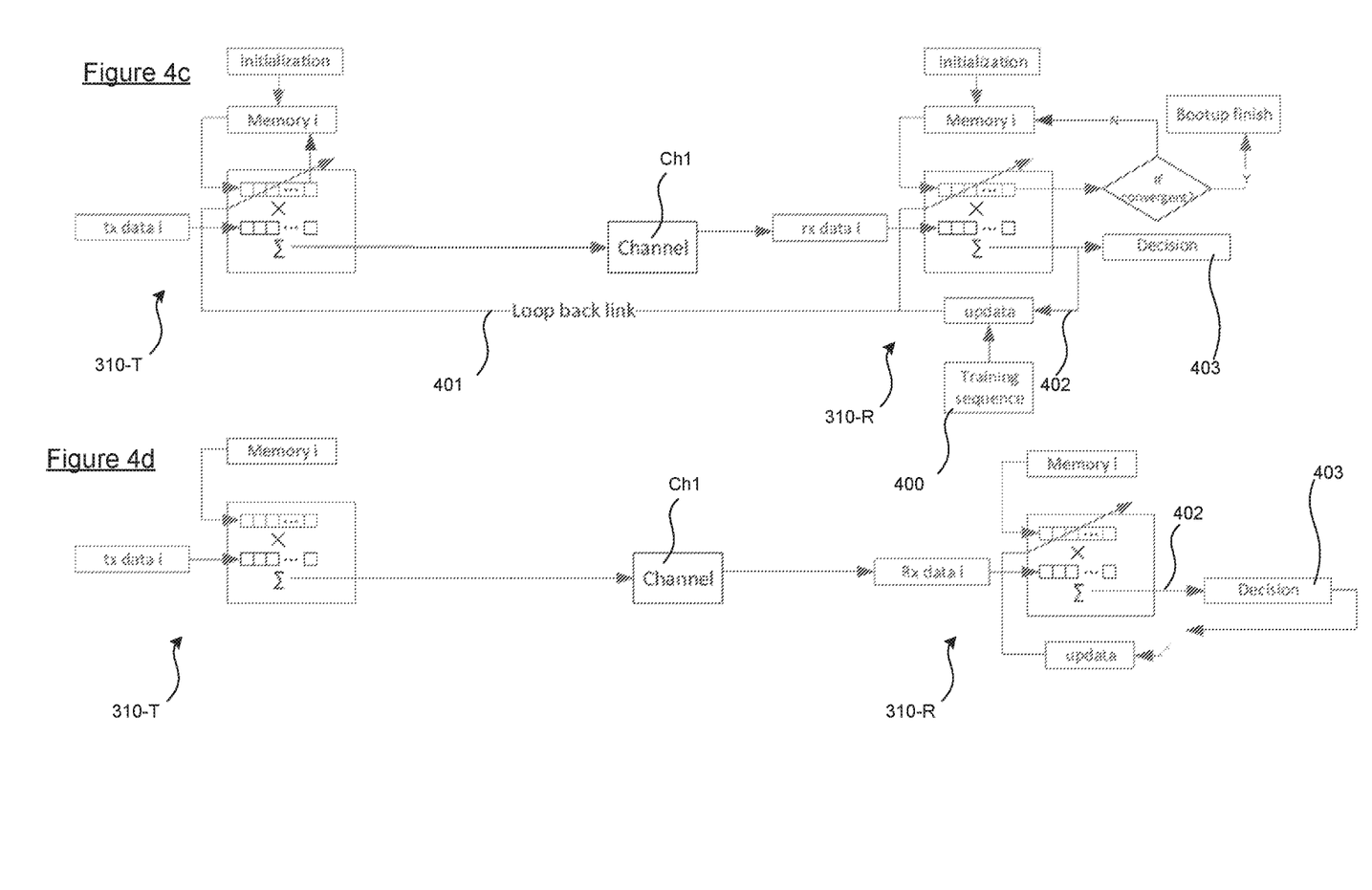
FIGS. 4c and 4d show process flows for determining and applying transmit-side equalizer coefficients respectively.

FIG. 4c shows a schematic process flow a training phase in which TX coefficients are determined, and FIG. 4d shows a schematic process flow for the steps of the transmitter node 102-T (transmitter) after the boot up phase. It is through the process of FIG. 4c that the sets of TX coefficients TXEQ1, TXEQ2, TXEQ3 stored at the transmitter 102-T are determined (see FIG. 3b). In the process of FIG. 4d, those TX coefficients are adapted by the transmitter 102-T using decision directed equalization (or without update and with constant coefficients obtained from the boot up phase).

FIGS. 4a-4d will now be described together.

For the circuit switched network 104, whose schedule is known a prior at the receiver 102-R, an equalizer caching algorithm to achieve equalizer convergence rate of a few tens of symbols. The method proceeds as follows. The steps taken to determine and then apply the RX coefficients are described first with reference to FIGS. 4a and 4b.

The method is described with respect to the transmitter 102-T and the receiver 102-R of FIGS. 3A and 3B, in relation to the first channel Ch1 connecting them However, as indicated above, every receiver node implements these steps separately for every transmitter node from which it receives data, in order to determine a set of RX EQ coefficients specific to that transmitter. Hence, the following description applies equally to any transmitter-receiver note pair in relation to whichever channel connects them.

During the bootup phase (FIG. 4a), a known piece of data is transmitted from the transmitter 102-T to the receiver 102-R via the applicable channel (i.e. the channel connecting those nodes)—the first channel Ch1 in this instance. That known piece of data is referred to as a "training sequence" and is denoted by reference numeral 400. However, what is actual received at the receiver 102-R will be a distorted training signal having channel distortion introduced by the applicable channel Ch1.

During the bootup phase, the RX equalizer 308-R is running in a "data-aided" mode. At first, the equalizer 308-R is initialized as an impulse when the data from the transmitter 102-T is received.

The coefficients of the RX equalizer 308-R are updated (S1), based on an output 402 of the RX EQ 308-R implemented at the receiver 102-R, using knowledge of the training sequence 400 (i.e. knowledge of what the true training sequence should be). Each time data from the transmitter 102-T is received, the RX coefficients RXEQ1 for the first channel Ch1 are stored in the local memory 302-R of the receiver 304-R and can be loaded into RX equalizer 308-R when data from the transmitter 102-T is received in the next cycle. The aim is to find coefficient(s) which match the output of the RX EQ 402 in the training phase (as obtained by equalizing the distorted training sequence) to the known training sequence as transmitted by the transmitter 102-T (the "clean" training sequence).

A boot up finish flag is raised (S2) when the RX equalizer 308-R is determined to have converged. This can be determined by measuring a MSE (mean-square error) or SNR (signal-to-noise ratio) at the output of RX equalizer 308-R (for example). The RX coefficients RXEQ1 stored in the memory 302-R in association with the applicable channel Ch1 are the EQ coefficients determined in the final iteration.

After the bootup phase, the communication phase can commence (FIG. 4b). Given that the receiver 102-R knows the corresponding transmitter 102-T of the next received packet from the schedule 310-R, the RX coefficients for that transmitter 102-T can be loaded before the input data from the transmitter 102-T is available. Therefore, high SNR can be achieved at the output of the equalizer 308-R as the equalizer is in convergence with low steady state MSE. The equalizer is only required to compensate for residual channel variation and can be updated e.g. using decision-directed EQ (decision directed mode).

A decision component 403 is shown, which is a functional component, which may be executed on or otherwise implemented by the processor 304-R of the receiver 102-R. e.g. as part of the RX EQ 308-R. The decision component 403 implements decision directed equalization in the communication phase only, when the RX EQ 308-R is operating in the decision directed mode. This is only needed when the equalizer is running at decision directed mode after bootup (i.e. in the communication phase) and is not needed for update in the training phase. In the communication phase, no further training sequence is needed; rather, in the communication phase, the receive-side EQ coefficients are adapted (e.g. using decision-directed equalization) as needed to account for time-varying channel conditions using only the signal at the output 402 of the RX EQ 308-R. This may also be referred to as "blind" equalization.

Alternatively, depending on the channel stability, the equalizer 308-R can potentially be as a fixed finite impulse response (FIR) filter or other RX EQ 308-R with fixed coefficients, without needing updates in the communication phase, to further reduce the implementation complexity. In that case, the decision component 403 may be used only for making a decision of which data has been transmitted after the equalization.

With reference to FIGS. 4c and 4d, in cases where transmit-side (TX) equalization is applied either partially or solely at the transmitter 102-T—such as channel pre-coding, pre-emphasis or vectoring (G.fast)—a similar equalizer caching method can also be used to achieve fast convergence of the adaptive filters.

The training sequence 400 is also used in the bootup phase for this purpose, in order to achieve fast convergence of the TX coefficients. The training sequence 400 is received by the receiver 102-R from the transmitter 102-T via the applicable channel Ch1, however a "loop back" channel 401 (link) from the receiver 102-R back to the transmitter 102-T is provided.

Note that the determination as to when convergence has been reached is still taken based on the output 402 of the receive-side EQ 308-R (e.g. based on its SNR, MSE etc.). However, that decision will implicitly take into account the transmit-side processing by the transmit-side EQ 308-T. At each iteration, the output 402 of the RX EQ or the calculated update information is communicated back to the receiver 310-T. The TX EQ coefficients to be applied in the next iteration may be determined at the receiver 102-R. or sufficient information to allow the TX coefficients for the next iteration to be determined for the next iteration at the transmitter 102-T.

Transmission-side equalization is important when the transmitter requires pre-emphasis, pre-coding or vectoring which is dependent on which receiver the data is sent to. The loop back link 401 is used to send the update information back to the transmitter side during the bootup stage. This can be done when the specific pair of nodes are operating in a reverted manner (data sending from the receiver 102-R to 102-T in FIG. 4c).

After the bootup phase, the loopback link 401 is not mandatory, and need not be maintained. Digital filters or other form of TX EQ 302-T at the transmitter side can use the TX coefficients that are cached in the memory 308-T.

As with the RX coefficients, in the communications phase (FIG. 4b), adaptive equalization may or may not be applied to the TX coefficients, depending on the extent of variability in the underlying channel conditions.

Returning to FIG. 6, this shows two graphs to compare equalizer convergence time for conventional adaptive equalization, without any known caching coefficients (602), and the described equalizer caching (600). The graph shows MSE on the y-axis, but this could be any suitable noise or distortion measurement. Time is measured in symbols, which are sub-divisions of cycles (e.g. there would typically be a few hundred to a few thousand symbols per cycle). As can be seen, the use of cached coefficients obtained in the bootup phase results in significantly faster convergence to a noise floor for equalizer caching 600 than conventional adaptive equalization 602. That is, adaptive equalization is able to converge faster when it starts from EQ coefficients learned from a training sequence in the boot up phase, because less compensation is needed to begin with.

A system 100 of the kind shown in FIG. 1 has various practical applications. For example, the nodes 102 could be server units in a server rack with an optical switch 104 provided to facilitate high speed optical communication between server units in the server rack. As another example, a switching network 104 of this kind could be provided to facilitate high speed communication between different server racks. Such server racks could for example be housed in a data centre. As another example, the nodes 102 could be CPU and memory devices with the switching network 104 providing communication between the CPU and memory devices. A practical application would be to network a plurality of physical memory devices to provide a single logical memory which abstracts away the fact that, at the physical level, the memory is provided in a distributed fashion.

Although optical networks are described by way of example, the subject matter is not limited in this respect and applies to any point-to-point switching network. For example, the switching network could be based on copper or other metal connections, or even wireless connections. For example, the nodes could be individual chips on a board and the switching network 104 could be provided on the board to allow communication between the different chips. The system 100 could even be an on-chip system for example with the nodes 104 being e.g. microprocessors and the switching network 104 providing communication therebetween.

According to a first aspect of the present disclosure provides a method of communicating signals via a switching network for effecting point-to-point communication between nodes, the switching network having a time-varying switching configuration, which causes successive activation and deactivation of multiple channels of the switching network, a first of the channels connecting, when activated, a transmitter node and a first receiver node, and a second of the channels connecting, when activated, the transmitter node and a second receiver node, the method comprising: in a training phase: transmitting from the transmitter node via the first channel a first known training signal, to cause the first receiver node to receive a first distorted training signal, using the first distorted training signal and knowledge of the first known training signal to determine one or more first transmit-side equalizer (EQ) coefficients, and storing, in memory accessible to the transmitter node, the first transmit-side EQ coefficients, in association with the first channel, transmitting from the transmitter node to the second receiver node a second known training signal, to cause the second receiver node to receive a second distorted training signal, using the second distorted training signal and knowledge of the second known training signal to determine one or more second transmit-side EQ coefficients, and storing, in memory accessible to the transmitter node, the second transmit-side EQ coefficients, in association with the second channel; wherein, in a communication phase, the transmitter node uses an available schedule to determine, for each time interval of multiple time intervals, which of the first and second channels is activated, and uses the transmit-side EQ coefficients associated with that channel to pre-equalize signals prior to transmission in that time interval via that channel.

For update the coefficients in the training phase, a known prior (undistorted signal) and the distorted training sequence after transmission are used. Although the transmitter node transmits an undistorted training signal, it is the distorted training signal that is actually received via the channel. The equalizer coefficients are determined from this distorted signal and the known a prior.

A channel may be bidirectional in the sense that messages can be sent via that channel in either direction (not necessarily simultaneously). i.e. the receiver node may also transmit to the transmitter node and the latter may also receive from the former. In that event, the distortion effect of the channel may be assumed to be symmetrical. i.e. it may be assumed that distortion is essentially independent of the direction of communication, and one set of transmit-side EQ coefficient(s) (and, where applicable, one set of receive-side EQ coefficient(s)) may be determined and applied by both nodes. Alternatively, that assumption may not be made, and a known training sequence may be transmitted via the channel in each direction to determine a (potentially different) set of transmit-side EQ coefficient(s) (and, where applicable, receive-side EQ coefficient(s)) for each direction of communication. The same training sequence may be used by all nodes in the training, which simplifies the process. Nevertheless, it is also possible to use different training sequences.

In embodiments, one or more first receive-side EQ coefficients may also be determined for at least the first channel using the first distorted training signal and knowledge of the first known training signal, and stored in memory accessible to the first receiver node in association with the first channel, the first transmit-side and first receive-side EQ coefficients co-operable to reduce distortion of the first channel: wherein the first receiver node may use the first receive-side EQ coefficients to equalize signals received from the transmitter node via the first channel.

The first receiver node may also receive signals via a third of the channels, the third channel connecting, when activated, the first receiver node and one of: the second receiver node, and a second transmitter node: wherein, in the training phase, the receiver node may receive a third distorted training signal from the other node, which may be used to determine one or more receive-side EQ coefficients for the third channel, which may be stored in the memory accessible to the first receiver node in association with the third channel: wherein, in the communication phase, the first receiver node may use an available schedule to determine, for each time interval of multiple time intervals, which of the first and third channels is activated, and may use the transmit-side EQ coefficients associated with that channel to equalize signals received via that channel.

At least one of the first and second receiver nodes may also transmit signals to at least one of: the transmitter node, the other receiver node, and a second transmitter node.

Each of the first and second receiver nodes may transmit to the transmitter node, via a loop back channel: the transmit-side EQ coefficients for the channel between that receiver node and the transmitter node, as determined at that receiver node: or information about the distorted training signal received at that receiver node for determining the transmit-side EQ coefficients at the transmitter node.

The loop back channel may be provided by the switching network.

At least one of the receiver nodes may apply adaptive equalization to signals received from the transmitter node in the communication phase to account for time-varying channel conditions of the channel between that receiver node and the transmitter node.

Adaptive equalization can be applied according to one-or more receive-side EQ coefficients which are adapted in the communication phase without exchanging a further training sequence in the communication phase. The one-or more receive-side EQ coefficients may or may not be initialized, in the training phase, based on the or another training sequence, but either way do not require a further training sequence in the communication phase, because they can be adapted from said pre-equalized signals transmitted in the communication phase alone.

The adaptive equalization may be decision directed equalization.

The switching network may be an active optical network comprising one or more optical switches having said time-varying switching configuration.

Each channel may be physical link or a logical channel provided by a physical link and a carrier frequency.

The physical link may comprise an optical fibre link.

The first and second transmit-side EQ coefficients may be determined at the first and second receiver nodes respectively, using an undistorted version of the training sequence stored in the memory of that receiver node.

Another aspect provides a system comprising a plurality of nodes and a switching network, the switching network having a variable switching configuration for causing successive activation and deactivation of multiple channels of the switching network, wherein the plurality of nodes is configured to implement any of the above steps.

Another aspect provides a transmitter node for connecting to a switching network, the node comprising: a communication interface for connecting to the switching network, the switching network having a variable switching configuration for causing successive activation and deactivation of multiple channels of the switching network: one or more processors configured to, in a training phase: transmit to a first receiver node a known training signal, via a first of said channels, thereby causing the first receiver node to receive a first distorted training signal, receive one of: one or more first transmit-side equalizer (EQ) coefficients determined from the first distorted training signal, and information about the first distorted training signal for determining the first transmit-side EQ coefficients, the first transmit-side EQ coefficients for reducing distortion of the first channel, store the first transmit-side EQ coefficients in association with the first channel, transmit to a second receiver node a known training signal, via a second of said channels, thereby causing the second receiver node to receive a second distorted training signal, receive one of: one or more second transmit-side equalizer (EQ) coefficients determined from the second distorted training signal, and information about the second distorted training signal for determining the second transmit-side EQ coefficients, the second transmit-side EQ coefficients for reducing distortion of the second channel, store the second transmit-side EQ coefficients in association with the second channel: and wherein the one or more processors are configured to, in a communication phase, access a schedule to determine, for each time interval of multiple time intervals, which of the first and second channels is activated, and use the transmit-side EQ coefficients associated with that channel to pre-equalize signals prior to transmission in that time interval via that channel.

Another aspect provides a receiver node for connecting to a switching network, the node comprising: a communication interface for connecting to the switching network, the switching network having a variable switching configuration for causing successive activation and deactivation of multiple channels of the switching network: one or more processors configured to, in a training phase: receive from a transmitter node, via one of said channels, a distorted training signal, compare the distorted training signal with a known training sequence to determine one or more transmit-side equalizer (EQ) coefficients for applying at the transmitter node to reduce distortion of the channel, and transmit the transmit-side EQ coefficients to the transmitter node for use in a communications phase.

The receiver node may be configured to transmit the transmit-side EQ coefficients via a loop-back channel of the switching network.

Any of the above processor(s) may be programmable (e.g. CPUs, FPGAs etc.) or non-programmable (e.g. ASICs).

Another aspect provides computer program instructions stored in one or more computer-readable data storage devices, the computer program instructions for programming one or more programmable processors of a node in accordance with the above.

The programmable processor(s) may, for example, be FPGA(s) and the instructions may comprise circuit description code for programming the FPGA to a circuit configuration for implementing the above: or the instructions may be for execution on a general-purpose processor such as a CPU etc.

It will be understood that any processor referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware). Reference is made herein to data storage for storing data, such as memory or computer-readable storage device(s). This/these may be provided by a single device or by plural devices. Suitable devices include for example a hard disk and non-volatile semiconductor memory (e.g. a solid-state drive or SSD). Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The invention claimed is:

1. A method comprising:
   in a training phase:
   transmitting, from a transmitter node via a first channel, a first known training signal to a first receiver node for receipt as a first distorted training signal,
   based on the first distorted training signal and the first known training signal, determining, by the transmitter node, a first transmit-side equalizer (EQ) coefficient associated with the first channel,
   transmitting, from the transmitter node via a second channel, a second known training signal to a second receiver node for receipt as a second distorted training signal, and
   based on the second distorted training signal and the second known training signal, determining, by the transmitter node, a second transmit-side EQ coefficient associated with the second channel; and
   in a communication phase:
   identifying, by the transmitter node, time intervals during which one of the first channel and the second channel will be activated; and
   equalizing, by the transmitter node using the first transmit-side EQ coefficient or the second transmit-side EQ coefficient, signals prior to transmission in the time intervals during which the one of the first and second channels will be activated.

2. The method of claim 1, wherein the transmitter node receives, via a loop back channel, from the first receiver node, information about the first distorted training signal received at that receiver node for determining the first transmit-side EQ coefficient at the transmitter node.

3. The method of claim 2, wherein the loop back channel is used during a bootup phase and not during the communication phase.

4. The method of claim 2, wherein the first transmit-side EQ coefficient reduces distortion of the first channel.

5. The method of claim 4, wherein the second transmit-side EQ coefficient reduces distortion of the second channel.

6. The method of claim 1, wherein the first transmit-side EQ coefficient and the second transmit-side EQ coefficient are different.

7. The method of claim 1, wherein the transmitter node uses an available schedule to determine the time intervals during which one of the first channel and the second channel is activated.

8. The method of claim 1, wherein the first channel and the second channel are physical links or logical channels provided by a physical link and a carrier frequency, and wherein the physical link comprises an optical fibre link.

9. A system comprising:
   a transmitter node;
   a first receiver node;
   a second receiver node; and
   a switching network, the switching network having a variable switching configuration for causing successive activation and deactivation of a first channel and a second channel of the switching network, the first channel connecting, when activated, the transmitter node and the first receiver node, and the second channel connecting, when activated, the transmitter node and the second receiver node, wherein the transmitter node is configured to implement operations of:
   in a training phase:
   transmitting via the first channel, a first known training signal to the first receiver node for receipt as a first distorted training signal,
   based on the first distorted training signal and the first known training signal, determining a first transmit-side equalizer (EQ) coefficient associated with the first channel,
   transmitting, via the second channel, a second known training signal to a second receiver node for receipt as a second distorted training signal, and
   based on the second distorted training signal and the second known training signal, determining a second transmit-side EQ coefficient associated with the second channel; and
   in a communication phase:
   identifying time intervals during which one of the first channel and the second channel will be activated; and
   equalizing signals, using the first transmit-side EQ coefficient or the second transmit-side EQ coefficient, prior to transmission in the time intervals during which the one of the first and second channels will be activated.

10. The system of claim 9, wherein the transmitter node receives, via a loop back channel provided by the switching network, from the first receiver node, information about the first distorted training signal received at that receiver node for determining the first transmit-side EQ coefficient at the transmitter node.

11. The system of claim 10, wherein the loop back channel is used during a bootup phase and not during the communication phase.

12. The system of claim 10, wherein the first transmit-side EQ coefficient reduces distortion of the first channel.

13. The system of claim 12, wherein the second transmit-side EQ coefficient reduces distortion of the second channel.

14. The system of claim 9, wherein the first transmit-side EQ coefficient and the second transmit-side EQ coefficient are different.

15. The system of claim 9, wherein the transmitter node uses an available schedule to determine the time intervals during which one of the first channel and the second channel is activated.

16. The system of claim 9, wherein the first channel and the second channel are physical links or logical channels provided by a physical link and a carrier frequency, and wherein the physical link comprises an optical fibre link.

17. The system of claim 9, wherein the switching network is an active optical network comprising one or more optical switches having time-varying switching configuration.

18. A transmitter node for connecting to a switching network, the transmitter node comprising:
   a communication interface for connecting to the switching network, the switching network having a variable switching configuration for causing successive activation and deactivation of multiple channels of the switching network;
   a processor; and
   a memory storing computer-executable instructions that, when executed by the processor, cause the processor to perform:
      transmitting, via a first channel, a first known training signal to a first receiver node for receipt as a first distorted training signal,
      based on the first distorted training signal and the first known training signal, determining a first transmit-side equalizer (EQ) coefficient associated with the first channel,
      transmitting, via a second channel, a second known training signal to a second receiver node for receipt as a second distorted training signal, and
      based on the second distorted training signal and the second known training signal, determining, a second transmit-side EQ coefficient associated with the second channel; and
   in a communication phase:
      identifying time intervals during which one of the first channel and the second channel will be activated; and
      equalizing signals, using the first transmit-side EQ coefficient or the second transmit-side EQ coefficient, prior to transmission in the time intervals during which the one of the first and second channels will be activated.

19. The transmitter node according to claim 18, wherein the first channel and the second channel are physical links or logical channels provided by a physical link and a carrier frequency, and wherein the physical link comprises an optical fibre link.

20. The transmitter node according to claim 18, wherein the computer-executable instructions further cause the processor to perform:
   receiving, via a loop back channel provided by the switching network, from the first receiver node, information about the first distorted training signal received at that receiver node for determining the first transmit-side EQ coefficient at the transmitter node.

* * * * *